United States Patent
Baron et al.

(10) Patent No.: US 8,942,140 B2
(45) Date of Patent: Jan. 27, 2015

(54) METHOD AND DEVICE FOR PARAMETERIZING A BRIDGE WITHIN A COMMUNICATION NETWORK

(75) Inventors: Stéphane Baron, Le Rheu (FR); Pascal Viger, Janze (FR)

(73) Assignee: Canon Kabushiki Kaisha, Tokyo (JP)

( * ) Notice: Subject to any disclaimer, the term of this patent is extended or adjusted under 35 U.S.C. 154(b) by 481 days.

(21) Appl. No.: 12/778,374

(22) Filed: May 12, 2010

(65) Prior Publication Data

US 2010/0290479 A1 Nov. 18, 2010

(30) Foreign Application Priority Data

May 13, 2009 (FR) ...................................... 09 53173

(51) Int. Cl.
*H04L 12/28* (2006.01)
*H04L 12/46* (2006.01)

(52) U.S. Cl.
CPC ........ *H04L 12/4625* (2013.01); *H04L 12/4641* (2013.01); *H04L 12/4675* (2013.01)
USPC ............................. 370/256; 370/252; 370/401

(58) Field of Classification Search
USPC ........................... 370/236, 249, 252, 256, 401
See application file for complete search history.

(56) References Cited

U.S. PATENT DOCUMENTS

| | | | |
|---|---|---|---|
| 6,188,694 B1 * | 2/2001 | Fine et al. ...................... | 370/402 |
| 6,388,995 B1 * | 5/2002 | Gai et al. ....................... | 370/256 |
| 6,628,624 B1 | 9/2003 | Mahajan et al. | |
| 6,937,576 B1 * | 8/2005 | Di Benedetto et al. ........ | 370/256 |
| 7,177,946 B1 * | 2/2007 | Kaluve et al. ................. | 709/242 |
| 7,366,191 B2 * | 4/2008 | Higashiyama ................. | 370/406 |
| 7,440,414 B2 * | 10/2008 | Higashiyama ................. | 370/254 |
| 7,646,733 B2 * | 1/2010 | Tallet et al. .................... | 370/256 |
| 7,848,264 B1 * | 12/2010 | Gai et al. ........................ | 370/256 |
| 7,916,741 B2 * | 3/2011 | Elmeleegy et al. ............ | 370/408 |
| 8,000,266 B2 * | 8/2011 | Bulusu et al. .................. | 370/256 |
| 8,059,668 B2 * | 11/2011 | Tallet et al. .................... | 370/402 |
| 8,144,577 B2 * | 3/2012 | Finn ................................ | 370/229 |
| 8,189,600 B2 * | 5/2012 | Jabr et al. ................. | 370/395.53 |
| 8,396,053 B2 * | 3/2013 | Giles et al. ..................... | 370/352 |
| 8,416,790 B1 * | 4/2013 | Busch et al. ................... | 370/401 |
| 8,665,886 B2 * | 3/2014 | Gupta et al. ................... | 370/401 |
| 2002/0196795 A1 * | 12/2002 | Higashiyama ................. | 370/401 |
| 2005/0100026 A1 | 5/2005 | Mancour | |
| 2006/0227735 A1 | 10/2006 | Baird et al. | |
| 2008/0267081 A1 * | 10/2008 | Roeck ............................ | 370/249 |
| 2009/0109876 A1 * | 4/2009 | Feng et al. ..................... | 370/256 |

OTHER PUBLICATIONS

Nov. 2, 2009 French Preliminary Search Report in French Patent Appln. No. 0953173.

* cited by examiner

*Primary Examiner* — Brian O'Connor
(74) *Attorney, Agent, or Firm* — Fitzpatrick, Cella, Harper & Scinto (57) ABSTRACT

In order to parameterize, within a communication network, a bridge to be put in communication with at least one element to be connected to the bridge, the bridge comprising at least one created port, a parameter representing a predetermined waiting period and corresponding to a time for detection by the bridge, during a phase of listening to the data received by the at least one created port, of the presence of any communication loop within the network, is determined. A filtering of the at least one created port is activated, the filtering being adapted to prevent the sending and reception by the at least one created port of inter-bridge management messages. The bridge is configured with the parameter thus determined, a new port of the bridge is created with a view to setting up communication with the at least one element, and the filtering is deactivated.

10 Claims, 9 Drawing Sheets

| Tunnel ID | Diameter | RTT max | Root ID | complexity | Port number |
|---|---|---|---|---|---|
| 0 | 0 | 1 ms | 12345 | simple | 1 |
| 1 | 1 | 220 ms | 2314 | simple | 2 |

METHOD AND DEVICE FOR PARAMETERIZING A BRIDGE WITHIN A COMMUNICATION NETWORK

FIELD OF THE INVENTION

The present invention relates to communication networks.

BACKGROUND OF THE INVENTION

Communication networks have developed considerably in particular because of the democratization of the high-speed internet and the appearance of general-public audiovisual equipment having network connectivity.

It is thus more and more often necessary to setup quasi-permanent network connections between individuals who have for example the same field of interest so that they share information of any type (audio, video, photo, text, etc).

Technologies such as the VPN (Virtual Private Network) technology for meeting this expectation are already known. This technology makes it possible for example to put in communication two networks of the LAN type (Local Area Network), or a network of the LAN type with distant equipment, in order to create a network of the virtual LAN type composed of the union of the two original LAN-type networks or the union of the original LAN-type network with the distant equipment.

To achieve this putting in communication, VPN technology uses a particular encapsulation method called "tunneling", which creates a tunnel between a bridge in an LAN-type network with an element to be connected to this network (for example another network provided with a similar bridge or an item of equipment).

This operation consists of encapsulating a level A protocol (embedded protocol) in a level B protocol (transport protocol) by virtue of an encapsulation protocol C. The transport protocol B treats the protocol A as if it were a question of useful data.

Bridges that implement tunneling protocols described for example by IEEE 802.1D are already known.

Each Ethernet segment is connected to the bridge by means of a port, each port thus enabling the various network interfaces to be connected, whether these interfaces be real (in the case of a local connection) or virtual (in the case of a connection by tunnel to a distant network or item of equipment).

At each new port opening, the bridge must ensure that it does not introduce a "loop" into the Ethernet network resulting from the interconnection of the various Ethernet networks.

This is because, if the topology of the resulting network describes a loop (that is to say there exist two possible different paths for reaching the same item of equipment), the result would cause a significant unnecessary overload of the various items of equipment on the network, or even total collapse of the network. More particularly, in the case of broadcast frames, a frame received on one of the ports would be duplicated and sent on the other ports of the bridge. Thus, in the case where a loop exists, one of the frames sent by the bridge would then return to it on one of its ports and this frame would then in its turn be duplicated and re-sent over all the ports of the bridge (other than the one by means of which the bridge received it). In this situation, the sending of a single frame will congest the network by the sending of these different replicas. This phenomenon, known as broadcast storm, is highly detrimental to the stability of the network.

There is already known, for preventing the creation of a loop, a protocol included in the IEEE 802.1D protocol called a Spanning Tree Protocol. This protocol transforms a network topology of the graph type (having redundant paths) into a tree (with no such paths). This protocol makes provision for closing certain ports on certain bridges of the network in order to cut the redundant paths.

To do this, this STP protocol determines a "root bridge", and then guarantees a loop-free path from the root bridge to all the other bridges in the Ethernet network. When on a bridge two ports are detected as forming part of a loop, one of the two ports goes into a state preventing frame relay via this port (the port is then blocked).

In order to determine the ports forming part of a loop, the root bridge sends a packet called BPDU (Bridge Packet Data Unit), which is relayed by the network bridges. If, on a bridge, this packet is received at more than one port, this means that there exists a loop between these ports and only one of these ports must remain open.

However, since the relaying of the BPDU packets by the network bridges are not immediate (relay subject to a time delay typically equal to 2 seconds) and the topology of the network may be complex, the STP protocol defines a waiting period ("Forward Delay"). During this time the bridges must await (listening phase) any BPDU packets on their various ports in order to detect the possible presence of loops.

This waiting period has a default value defined by IEEE 802.1D standard and which is 15 seconds.

Improved protocols are already known (such as the RSTP protocol defined by IEEE 802.1W standard or the protocol defined in patent U.S. Pat. No. 6,628,624) in which the bridge is parameterized in advance so that certain ports open without a waiting period when the network topology so permits.

SUMMARY OF THE INVENTION

The invention relates to a method of parameterizing a bridge to be put in communication with at least one element of a communication network, which is both more efficient and just as reliable as the techniques proposed in the prior art.

It proposes for this purpose a method of parameterizing, within a communication network, a bridge to be put in communication with at least one element to be connected to said bridge, said bridge comprising at least one created port, wherein it comprises the following steps:

determining, according to at least one item of topology information on said network, a parameter representing a predetermined waiting period and corresponding to a period for detecting by said bridge, during a phase of monitoring the data received by said at least one created port, a potential communication loop within said network;

activating a filtering of said at least one created port, said filtering being adapted to prevent sending and receiving inter-bridge management messages via said at least one created port;

configuring the bridge with said determined parameter;

creating a new port of said bridge to set up the communication with said at least one element; and deactivating said filtering.

Communication network means here any assembly formed by at least two elements (each element being either an item of equipment or a network of the LAN type) and an intermediate network (such as the internet) for putting these two elements in communication.

Determining the waiting period from topology information makes it possible to choose, as a value for this duration, a value that is specifically adapted to the environment of the bridge with which the communication is to be set up. This helps reducing the total waiting period before the data can be exchanged between the element to be connected and the bridge to which it will be connected.

The waiting period is thus neither too short (risk of failing with the detection of a loop) nor too great (unnecessary slowing down of the system) but is thus specifically adapted to the port to be created.

The use of a filtering makes it possible, for its part, to temporarily isolate the bridge to be configured from the rest of the network. This makes it possible to configure the bridge with the previously determined parameter value, whether this bridge be root or not, without the other bridges being affected thereby.

It is only once the port has been created that the filter is deactivated.

This method thus makes it possible to specifically configure each of the ports to be created, for each bridge, which helps to significantly reduce the total waiting period at each new opening of a port.

This makes it possible in particular to envisage openings of tunnels and uses in the context of an isolated transmission of short duration (for example when a single file is transmitted), with a relatively short waiting period if the configuration so permits, so that there is no risk that the user may wrongly consider this waiting to be a blockage of the system.

In addition, the waiting period is determined at each new creation of a port, thus taking into account the topology of the network at the time of its opening, whereas in the protocols of the prior art it is necessary to know in advance the topological characteristics of the network, the administrator having to perform a manual parameterizing of each bridge according to the topology of the network.

The method of the invention thus offers a dynamic configuration of each bridge (in contradistinction to the configurations already known).

Finally, this method is a method of controlling the bridge that also has the advantageous possibility of being externalized to the bridge while being for example implemented on a controller of this bridge.

According to another characteristic, the step of determining a parameter representing a predetermined waiting period is obtained according to at least one item of topology information on the network relating to said element.

According to another characteristic, the step of determining a parameter representing a predetermined waiting period is also obtained according to at least one item of topology information on the network relating to said bridge.

Determining the parameter representing the waiting period from at least one item of topology information on the element to be connected to the bridge and possibly from at least one item of topology information on the bridge itself makes it possible to define this waiting period with very great precision.

According to another characteristic, the method comprises a step of updating each item of topology information.

The topology information is thus re-updated at each port opening so as to faithfully correspond to the actual topology of the network.

According to another characteristic, in the case where the bridge is root, the step of configuring the bridge is implemented by a direct configuration of the bridge.

According to another characteristic, in the case where the bridge is not root, the step of configuring the bridge comprises a step of determining, within the network, a path to the root bridge associated with this bridge and a step of generating an inter-bridge management message simulating an inter-bridge management method coming from said associated root bridge via said determined path.

Thus, if direct configuration is not possible (bridge not root), generating a simulated inter-bridge management message nevertheless makes it possible to configure the bridge in question, which makes it possible to apply the parameterization method according to the invention to all the bridges in the communication network, whether or not they be root.

According to another characteristic, the configuration step further comprises a step of receiving said inter-bridge management message via a virtual interface of said bridge.

This thus enables the bridge to receive this message although a filtering of the messages is used.

According to another characteristic, the putting of said bridge in communication with said element to be connected is implemented by setting up a tunnel between said new port and said element.

According to another characteristic, said bridge is associated with a tunnel end-point for setting up said tunnel.

The putting in communication by the setting up of a tunnel thus makes it possible to communicate transparently in real time and if applicable in a secure fashion.

According to another characteristic, the step of determining the waiting period is also implemented from at least one other item of information obtained from the requests exchanged between the bridge and the element to be connected to said bridge before setting up said communication.

Advantage is thus advantageously taken of the exchange of the requests between the bridge and the element to be connected in order to collect information on the network making it possible to determine with even more precision the waiting period necessary. It is thus possible, in a first example, to use messages exchanged between the bridge and the element to be connected in order to determine (or calculate) a transit time for a data item between the bridge and the element to be connected (or a round-trip time). It is also possible, in a second example, to use the messages for the setting up of a tunnel between the bridge and the element to be connected in order to pass (and obtain) information, such as information representing the relative topology of the element to be connected or information relating to a transit time for data between the bridge and the element to be connected (or a round-trip time).

For the same purpose as that indicated above, the present invention also has a device for parameterizing, within a communication network, a bridge to be put in communication with at least one element to be connected to said bridge, said bridge comprising at least one created port, wherein it comprises:

means for determining, according to at least one item of topology information on said network, a parameter representing a predetermined waiting period and corresponding to a period for detecting by said bridge, during a phase of monitoring the data received by said at least one created port, a potential communication loop within said network;

means for activating a filtering of said at least one created port, said filtering being adapted to prevent sending and receiving inter-bridge management messages via said at least one created port;

means for configuring the bridge with said determined parameter ;

means for creating a new port of said bridge with a view to setting up communication with said at least one element; and means for deactivating said filtering.

Still for the same purpose, the present invention also relates to a means of storing information, able to be read by a computer or a microprocessor storing instructions of a computer program, wherein it enables the implementation of a parameterizing method as disclosed above.

Still for the same purpose, the present invention also relates to a computer program product that can be loaded into a programmable apparatus, wherein it comprises sequences of instructions for implementing a parameterizing method as disclosed above, when this program is loaded into and executed by the programmable apparatus.

The particular features and advantages of the parameterizing device, of the information storage means and of the computer program product being similar to those of the parameterizing method, they are not repeated here.

BRIEF DESCRIPTION OF THE DRAWINGS

The disclosure of the invention will now be continued with the detailed description of an example embodiment, given below, for illustrative but non-limitative purposes, with reference to the accompanying drawing, in which.

DETAILED DESCRIPTION OF THE PREFERRED EMBODIMENTS

Figure 1:
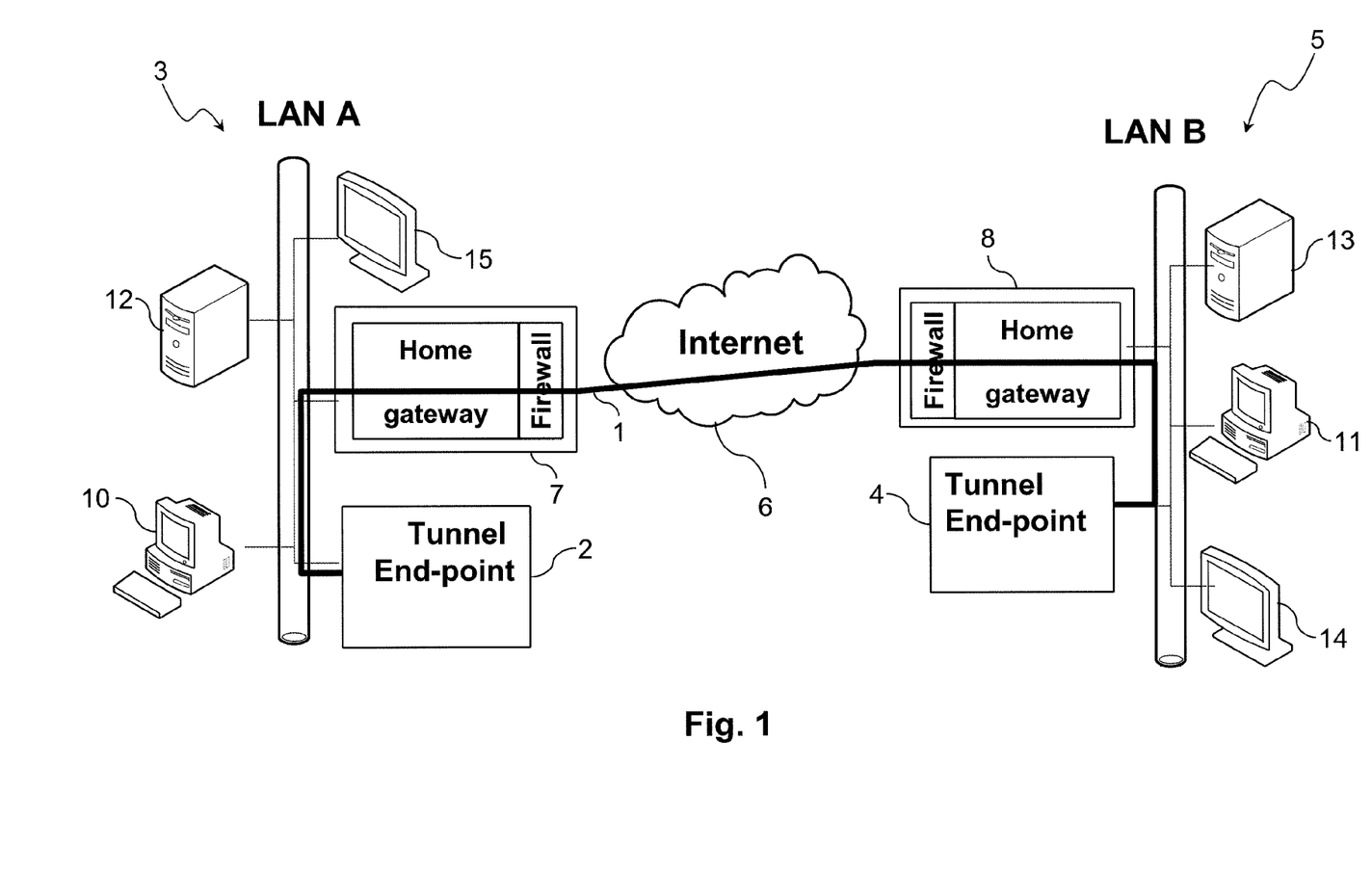
FIG. 1 is a schematic representation of two networks of the LAN type put in communication by means of a tunnel.

A typical configuration of a virtual private network in which a tunnel is implemented will first of all be described with the help of FIG. 1.

Such a tunnel 1 is set up in FIG. 1 between a tunnel end-point 2 of a first network 3 (LAN A) and a tunnel end-point 4 of a second network 5 (LAN B) through a communication network 6 such as the internet (in order to simplify the figure, the infrastructure equipment of the internet 6 such as routers have not been shown).

The network 3 (or respectively the network 5) comprises a module 7 (or respectively 8) for accessing the high-speed internet 6, this equipment comprises a domestic gateway and a firewall.

Elements of the PC type 10 and 11, servers 12 and 13 for storing and sharing digital media and other equipment such as multimedia displays (media players) 14 and 15 are also included in these LAN networks.

The tunnel is set up between two tunnel end-points 2 and 4, and each packet (also called a frame) sent by equipment connected to one of the two networks is encapsulated by the tunnel end-point of this network and then sent to the tunnel end-point of the other network, which will de-encapsulate it to enable these data to be read.

Setting up the tunnel 1 thus enables the equipment 10 to 15 of the two networks to communicate with each other even it they do not belong to the same LAN network.

For example, the PC 10 of the network 3 can communicate with the server 13 of the network 5 by means of the tunnel 1.

The various elements for setting up a tunnel will now be described in detail with the help of FIG. 2.

This figure shows three LAN networks 20 (LAN A), 21 (LAN B), and 22 (LAN C) similar to the networks 3 and 5 in FIG. 1, that is to say they each have a gateway (not shown in FIG. 2) giving access to the internet.

These networks together, to which the internet is added, constitute a communication network within the meaning of the invention.

The network 20 (or respectively 21 and 22) comprises a tunnel end-point 23 (or respectively 24 and 25).

Between the tunnel end-points 23 and 24 there is set up a tunnel 26 while between the tunnel end-points 23 and 25 there is set up a tunnel 27. The transit of the data takes place from one tunnel end-point to the other by means of the gateways of the type shown in FIG. 1.

The tunnel end-points 23 and 24 each have a bridge (respectively 30 and 31) for relaying frames issuing from the tunnels to the equipment connected to the LAN network of the corresponding tunnel end-point and vice versa.

It should be stated here that each bridge manages a set of at least one MAC address table, each table being associated with a port of the bridge and indicating all the known MAC addresses on the Ethernet segment connected to this port. Each table results from a learning mechanism enabling the bridge to update the MAC addresses at each reception of an Ethernet frame via the port associated with this table.

The bridge must ensure that the frames sent by equipment connected to the Ethernet segment, intended for equipment situated on another segment, are correctly relayed by the latter. Thus this enables the equipment situated on two different segments to be interconnected by the bridge. However, a bridge relays an Ethernet frame presented on one of its ports to another of its ports only under certain conditions. This is achieved in order not to unnecessarily contaminate the various segments with Ethernet frames solely useful to the communication of two items of equipment which, for example, would belong to the same Ethernet segment.

Thus a bridge relays a frame only if one of the following three conditions is fulfilled:
  the addressee of the frame received on a port is known and appears in one of the MAC address tables of the bridge associated with a port other than the one on which the frame is received;
  the destination address of the frame is unknown to the bridge (does not belong to any of the MAC address tables);
  the destination address is a broadcast address designed to be broadcast over the whole of the network.

The bridge must also ensure, as seen previously, that it must not create a loop within the network at each new port opening.

In the example illustrated, the bridge 30 (or respectively 31) has ports 34, 35 and 36 (or respectively 37 and 38) for connecting the various network interfaces, whether these interfaces be real (in the case of a local connection) or virtual (in the case of a connection by tunnel to a distant network or item of equipment).

To open a new connection by tunnel on one of these tunnel end-points, the latter must add a new port to the corresponding bridge. This port will be seen by the bridge as an interface to the distant network.

Figure 2:
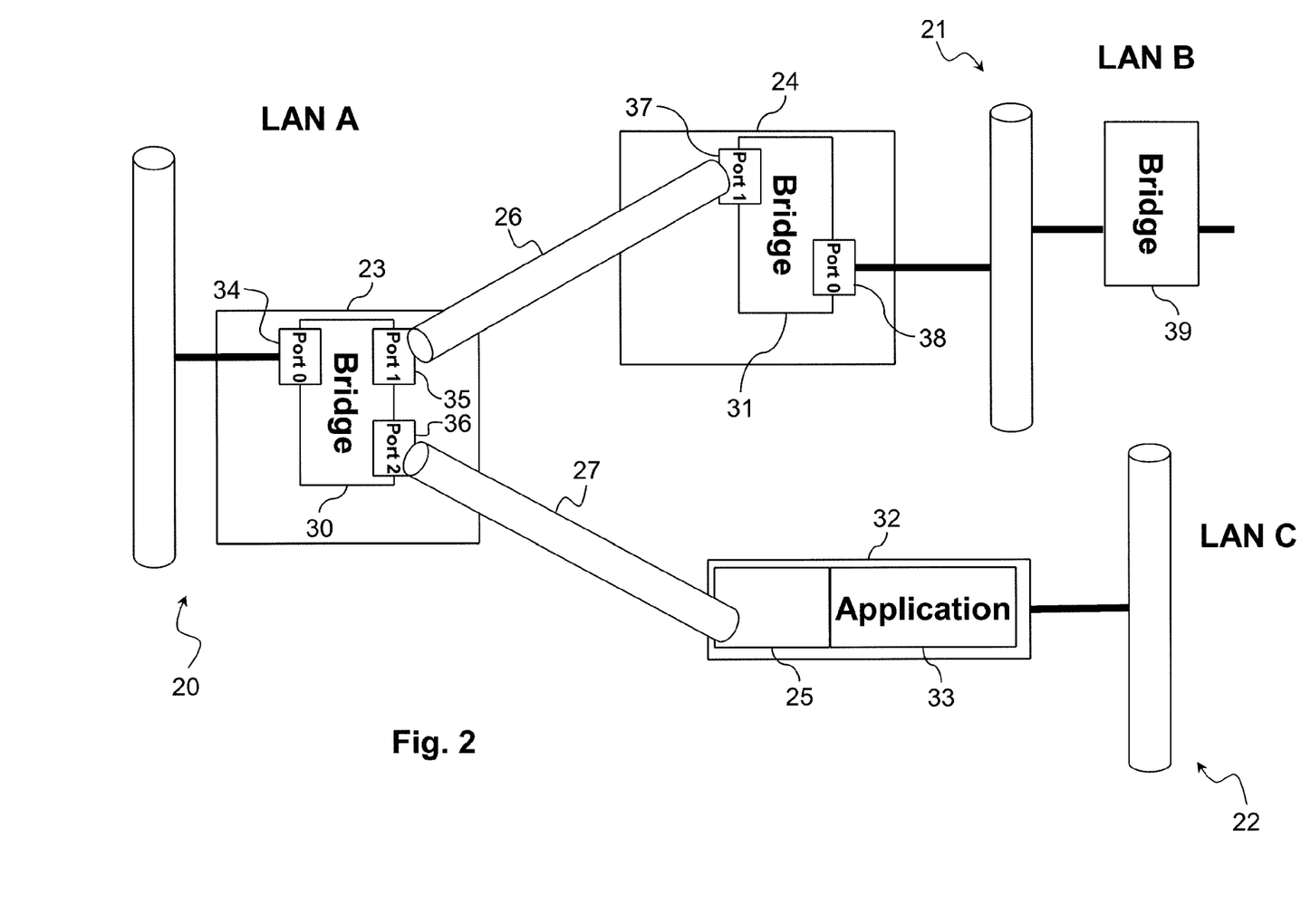
FIG. 2 is a view similar to FIG. 1, but in which three networks of the LAN type are shown, only two of which comprise a bridge.

Thus in FIG. 2, when the tunnel 26 is opened for example, the tunnel end-point 23 has created the port 35 in the bridge 30 and tunnel end-point 24 has created the port 37 in the bridge 31.

Once the ports are created and the listening phase completed, the bridge can relay the frames between the ports, thus enabling the tunnel to function. Thus, for the equipment, everything happens as if they were connected to the same network, the communications between two items of equipment via the tunnel being called end-to-end communications.

The tunnel end-point 25, for its part, has no bridge and is integrated in an item of equipment 32. This tunnel end-point directly exchanges frames between the application 33 of this equipment 32 and the tunnel end-point 23 by means of the tunnel 27, which has been able to be opened by the creation of the port 36 on the bridge 30.

The equipment 32 is thus connected to the LAN networks 20 and 21 and can communicate via the tunnels 26 and 27 with other equipment in the networks 20 and 21.

When all the tunnels are set up, the networks 20, 21 and the equipment 32 are thus joined, forming a global communication network. On the other hand, the tunnel 25 not having a bridge, the network 22 does not form part of the communication network formed by the networks 20, 21 and the equipment 32.

It will be noted that one and the same tunnel end-point, such as the head 23, can be caused to manage several tunnels destined for other tunnel end-points in order to interconnect a first LAN network to several other networks.

It will also be noted that the networks can have bridges other than those included in the tunnel end-point according to the invention, as is the case with the bridge 39 in the network 21 illustrated in FIG. 2, and/or that the equipment such as the equipment 32 is not necessarily connected to a network such as the network 22.

Finally, it will noted that the parameterizing method according to the invention thus enables a bridge, such as the bridge 30, to be put in communication with an element to be connected to this bridge, such as another bridge (the bridge 31) or such as an item of equipment (the equipment 32).

Figure 3:
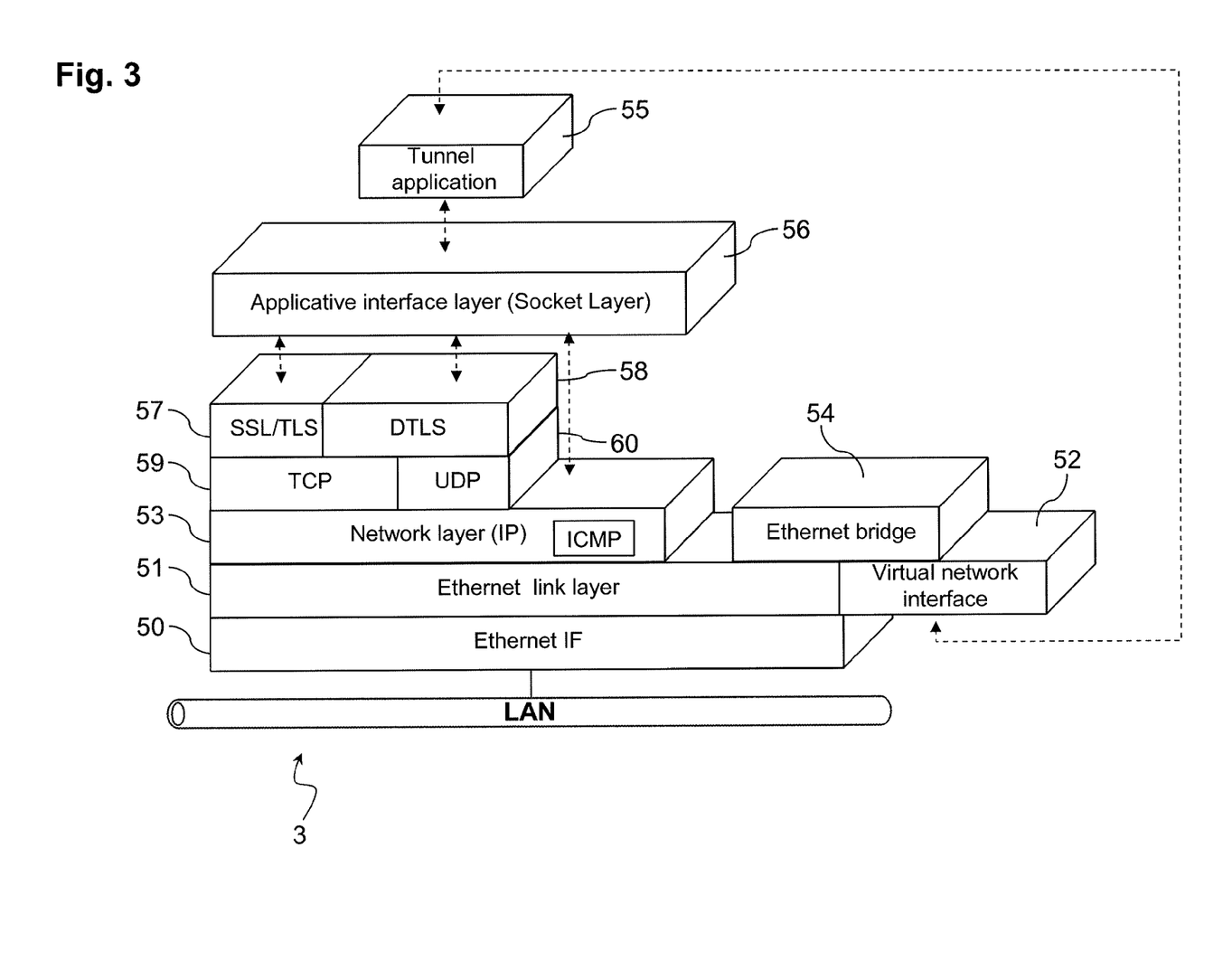
FIG. 3 is an example of a layer model of a tunnel end-point in which the method according to the invention is implemented

The routing of the Ethernet frames that will pass through the tunnels set up between the tunnel end-points according to the invention will now be described with the help of FIG. 3.

This figure illustrates the protocol layers implemented in the tunnel end-points 23 to 25 which are necessary for the setting up of the tunnels, the protocol elements necessary for the functions other than the setting up of the tunnel not being shown here.

Each tunnel end-point thus comprises a physical Ethernet interface 50 that transmits the Ethernet frames coming from the equipment of the LAN network to which the tunnel end-point belongs to an Ethernet connection link layer 51 for routing.

This Ethernet link layer 51 transmits the frames either to a network layer 53 for the frames intended for the equipment comprising the tunnel end-point, or to the layer 54 of the bridge that comprises this head for the other frames.

The bridge layer 54 performs operations of filtering the Ethernet frames and the relaying of these frames to the appropriate Ethernet port or port.

This bridge layer cooperates with the Ethernet link layer 51 that constitutes the physical interface of the bridge and with a virtual network interface 52 that simulates a virtual Ethernet controller and is created for each tunnel.

This virtual interface is created for each tunnel by a tunnel application 55 that the tunnel end-point has in order to deliver to this interface the Ethernet frames that must transit over the tunnels.

The tunnel application 55 also performs all the operations necessary for the use of each tunnel, such as in particular the configuration, filtering, encapsulation and extraction (or de-encapsulation) of frames.

In the case of a frame of the LAN network (such as the network 3 illustrated in FIG. 1) intended to be sent via a tunnel to the other LAN network (the network 5), this frame passes through the layers 50 and 51 in order to reach the bridge which, while detecting that this frame is intended for the tunnel, transfers it over the virtual interface 52 in order to be encapsulated by the tunnel application 55 of the tunnel end-point 2.

This frame processed by the application 55 is put back in the form of packets through an application interface 55 with a transport protocol that is reliable 59 (TCP) or not reliable 60 (UDP) respectively protected by the protocols 57 (SSL) and 58 (DTLS).

The packets thus transported are sent to the LAN network after passage of the network layers 53, 51 and 50 in order to be transferred through the domestic gateway of the module 7 to the LAN network 5 through the tunnel 1 (FIG. 1).

The reception of a frame coming from a tunnel will, in the tunnel end-point, follow the route opposite to that presented above.

The encapsulated frame will thus be extracted by the application 55 after it has passed through the layers 50, 51, 53, 59 or 60 and 57 or 58 and will then be received on the virtual interface 52, which will send it to the bridge layer 54 so that the latter redirects it to the LAN network 3 after having passed through the layers 51 and 52.

A description will now be given, with the help of FIGS. 4 and 5, of the concatenation of the operations performed by a tunnel end-point 70, creating a port for setting up a connection by tunnel with another tunnel end-point 71.

According to a first step S72, this tunnel end-point 70 (the client tunnel end-point) sets up a carrier with the tunnel end-point 71 with which it wishes to set up the connection (the server tunnel end-point).

This carrier may for example be a TCP session for exchanging frames between the tunnel end-points.

Figure 5:
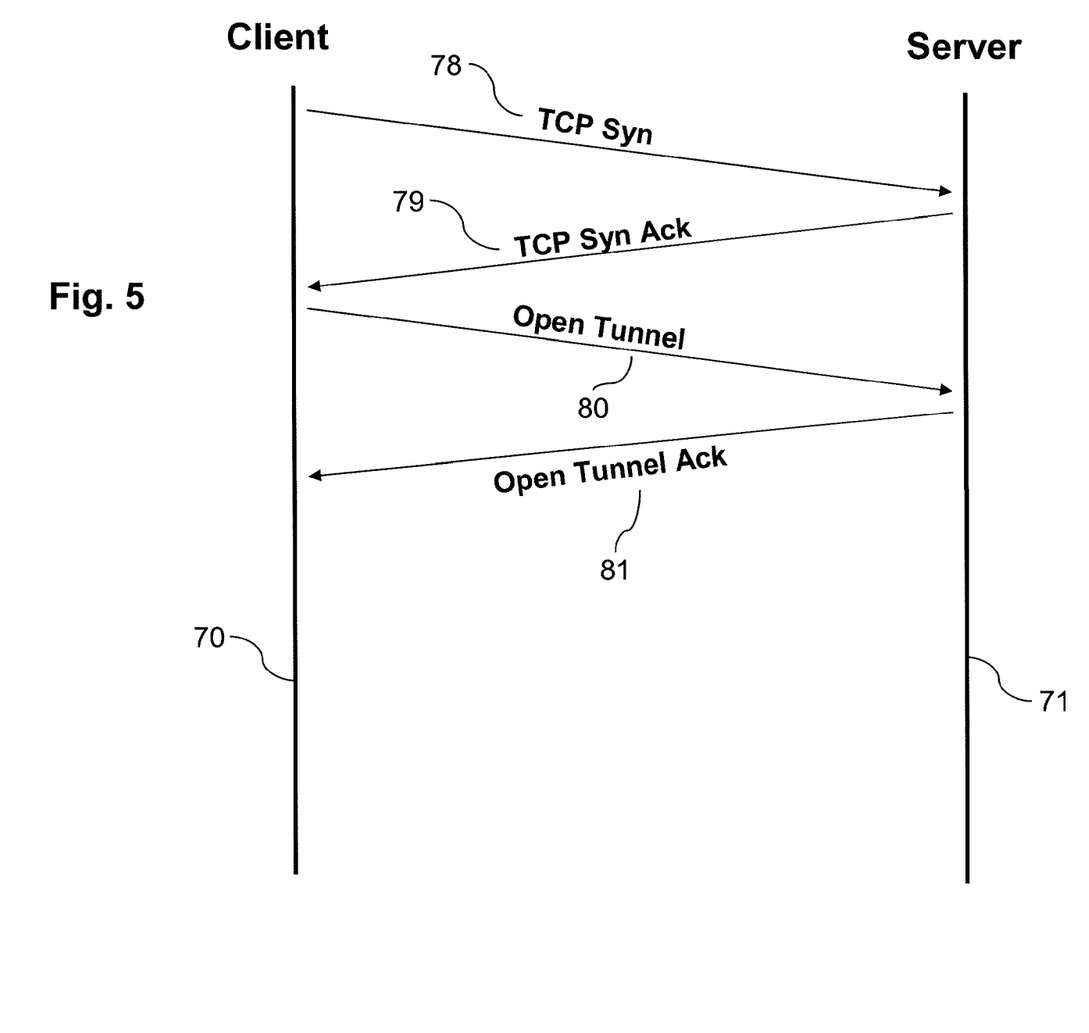
FIG. 5 is a schematic representation of the data exchanges between two tunnel end-points.

For this purpose, and as illustrated schematically in FIG. 5, a first frame 78 "TCP Syn" is sent by the client 70 to the server 71. On receipt of this frame 78, the tunnel end-point 78, which assumes the role of server, sends in response an acknowledgement frame 79 "TCP Syn Ack" to the client tunnel end-point.

On receipt of this frame by the client the following step S73 is implemented in which the client requests the server to open a tunnel.

For this purpose, the client sends a second frame 80 "Open Tunnel" and the server responds, on receipt of this frame 80, with a frame 81 accepting opening of the tunnel "Open Tunnel Ack".

One type of protocol for these exchanges is for example the L2TP protocol ("Layer Two Tunnel Protocol").

These protocol exchanges are used to determine a value of a round-trip time from end to end in the network (known in English by the acronym RTT, standing for "Round Trip Time").

If it is considered that the processing time between the receipt of a request frame and the sending of a response frame (in response to the request frame) is negligible compared with the RTT value (which is very broadly the case on long-range networks such as the internet, but also for LAN networks), the value of the RTT can be considered to be substantially equal to the time elapsed between the sending of the request frame and the receipt of the response frame.

Thus, in the case of the exchange illustrated in FIG. 5, the client 70 makes a first evaluation of the value of the RTT by measuring the time elapsed between the sending of the frame 78 and the receipt of the frame 79. The client 70 will be able to refine this value by measuring the time elapsed between the sending of the frame 80 and the receipt of the frame 81, and then by averaging this value with the RTT value already evaluated.

The server 71 for its part can determine a value of the RTT by measuring the time elapsed between the sending of the frame 79 and the receipt of the frame 80.

These protocol exchanges also make it possible to exchange information on the topology of the client and server networks.

The frame 80 comprises information on the topology of the network to which the client 70 is connected, while the frame 81 comprises information on the topology of the network to which the server 71 is connected, so that the topology information on the two LAN networks is thus known at the client 70 and at the server 71.

The information on the topology thus conveyed can take three values:
- the "equipment" type, which indicates that the corresponding tunnel end-point (client 70 or server 71) does not have a bridge, such as for example the tunnel end-point 25 illustrated in FIG. 2; this type of topology corresponds for example to mobile equipment able to integrate a tunnel end-point (telephone, photographic apparatus, camcorder, etc);
- the "simple topology" type, which indicates that the corresponding tunnel end-point comprises a bridge but that the LAN network to which this head belongs does not have any other bridge or any other tunnel; and
- the "complex topology" type, which indicates that the corresponding tunnel end-point comprises a bridge and that the LAN network to which this head belongs has at least one other bridge or one other tunnel to simple or complex networks.

Each tunnel end-point thus has its own type of topology which, as will be seen below, may change over time according to the openings/closings of the tunnel.

Other information is also exchanged in order to enable, as will be seen below, a fine determination of the bridge waiting period: for example, the diameter of the network (the maximum number of network segments separating two items of network equipment) the identifier of the root bridge of the network, or the maximum RTT measured between the tunnel end-point and the equipment of the local network (to which the tunnel end-point is connected).

Figure 8:
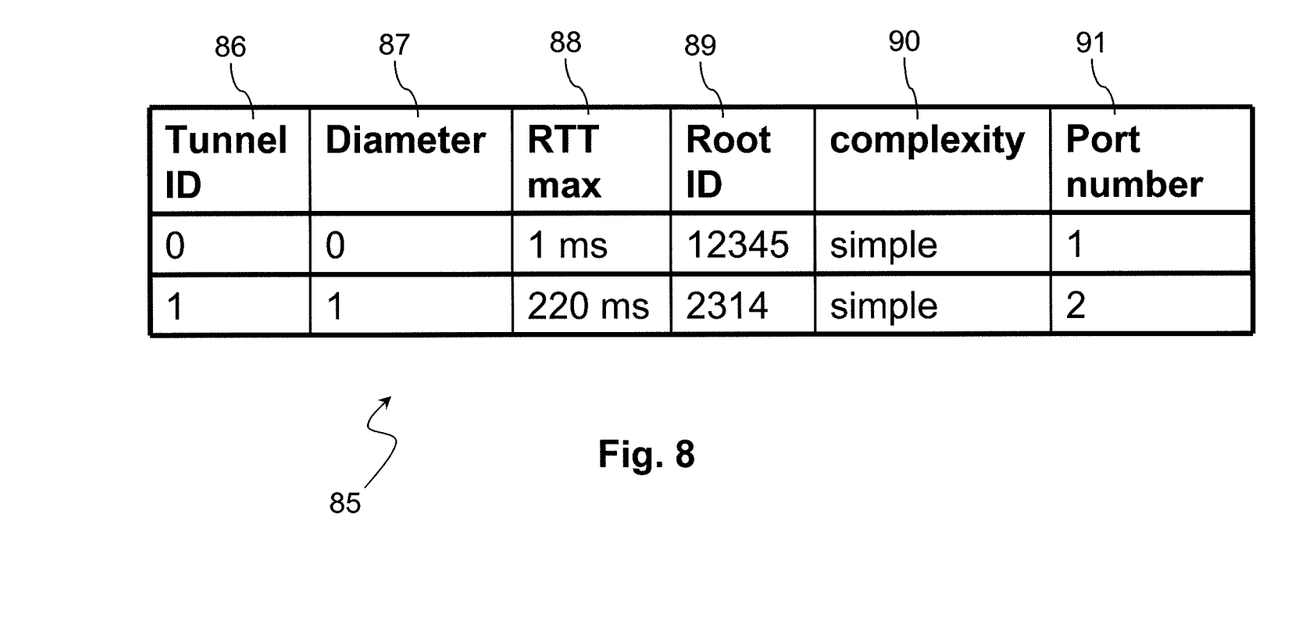
FIG. 8 describes a table containing the information relating to each tunnel open on a local tunnel end-point.

All this information is stored locally in a data table 85 illustrated in FIG. 8.

This table contains the information relating to each tunnel open on the same tunnel end-point (one line per tunnel) with the exception of the first line (of tunnel index 0), which corresponds to the data of the local network (to which the tunnel end-point is connected).

The field 86 is a unique identifier allocated by the tunnel end-point when a network is opened (this identifier is in the example illustrated a counter incremented at each tunnel opening). The value 0 is reserved for the local network (to which the tunnel end-point is connected).

The field 87 corresponds to the diameter of the distant network (the network of the server if the local network (to which the tunnel end-point is connected) is the client network and conversely otherwise) corresponding to the tunnel the identifier of which is equal to the field 86.

The field 88 corresponds to the $RTT_{max}$ of the distant network (maximum round trip time for communication between the local tunnel end-point and any equipment connected to this distant network).

The field 89 contains the identifier of the root bridge of the distant network (the smallest value of the identifier of the bridges of the distant network).

The field 90 contains the value of the complexity variable of the distant tunnel end-point, this value corresponding to the complexity of the topology of the distant network.

The field 91 corresponds to the port number of the bridge associated with the tunnel whose identifier value is equal to the field 86.

On receipt of the frame 80 in the case of the server and of the frame 81 in the case of the client, the tunnel end-point 70 or 71 adds a line in the tunnel table 85. The value of the field 87 is that received in the frame 80 for the server and in the frame 81 for the client increased by one in order to take account of the tunnel.

The value of the field 88 is that received in the frame 80 in the case of the server and in the frame 81 in the case of the client increased by the value of the RTT between the client and the server determined previously by virtue of the exchanges of the requests 78 to 81.

These request exchanges thus make it possible to obtain information (RTT) which, as will be seen below, will be useful for determining the parameter FD (standing for "Forward Delay") representing the waiting period to be applied to this bridge when new port is opened.

The other values conveyed by the frame 80 in the case of the server and by the frame 81 in the case of the client are stored without modification.

This line of the table 85 corresponding to the tunnel currently being opened is deleted when the tunnel is closed.

Once information about this table has thus been given, the different parameter or parameters of the bridge that the tunnel end-point has are determined at step S74 and in particular the parameter FD representing the waiting period to be applied to this bridge when a new port is opened.

Figure 6:
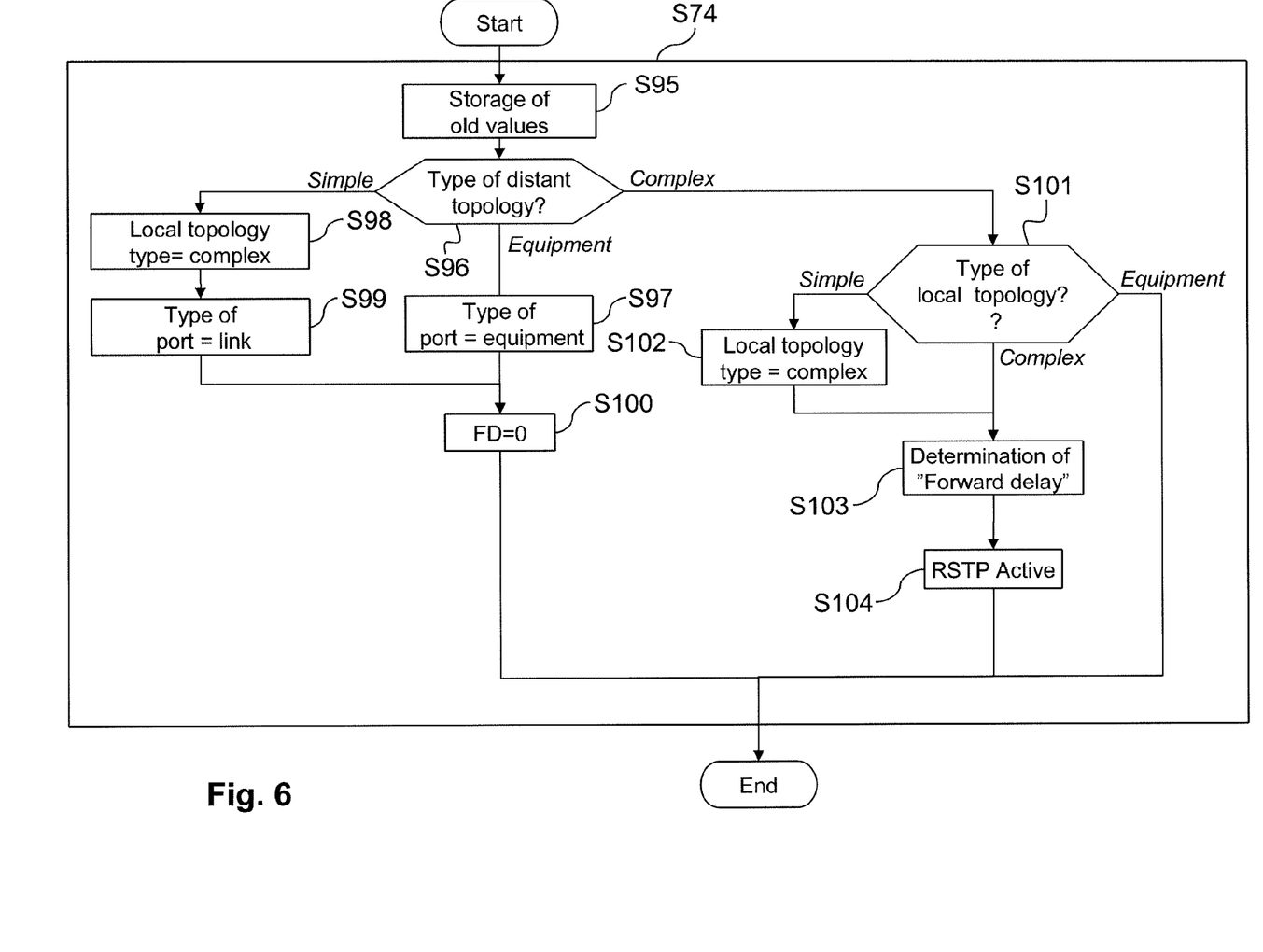
FIG. 6 is flow diagram specifying in detail one of the steps illustrated in FIG. 4.

This step will be detailed below with the help of FIG. 6.

In a step S75 following step S74, the bridge is configured with its parameter or parameters determined previously, whether this bridge be root or not, and this without disturbing the "normal" functioning of the spanning tree determination algorithms.

This step will be detailed below with the help of FIG. 7.

During the following step S76 a virtual port is created on the bridge in order to enable the exchange of data.

Figure 7:
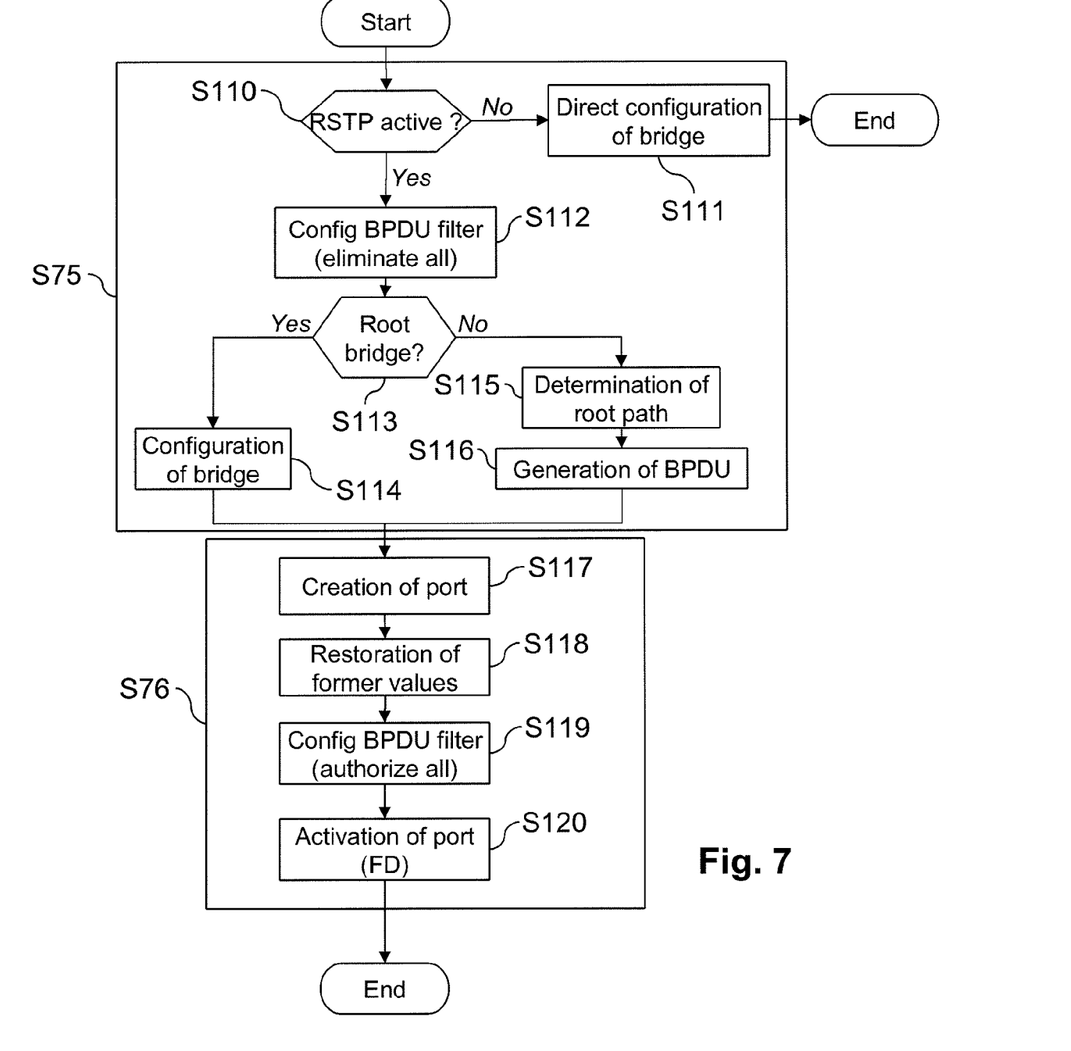
FIG. 7 is flow diagram presenting in detail another of the steps shown in FIG. 4.

This step will also be detailed with the help of FIG. 7.

Finally, the following step S77 starts the process for transferring the data from the virtual interface thus generated to the tunnel or in order to receive them, thus enabling the equipment of the client and server networks to communicate with each other.

Figure 4:
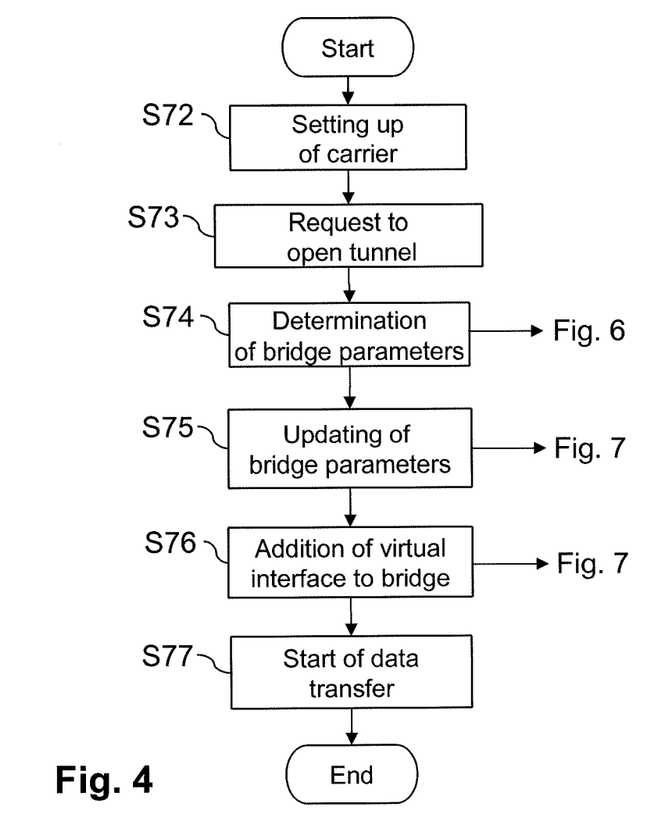
FIG. 4 is a flow diagram describing the concatenation of the operations performed by a tunnel end-point implementing the method according to the invention when a port is opened.

The algorithm in FIG. 4 is then terminated.

A description will now be given with the help of FIG. 6 of the way in which the value of the parameter FD is determined (corresponding to the waiting period of the bridge to be parameterized) according to the information contained in the table 85.

First of all, step S95 is implemented in order to determine the current values of the bridge parameters (determination of the type of spanning tree protocol on the bridge, determination whether this spanning tree is active or not and determination of the value of the current waiting period on the bridge) and this information is then stored in a local memory.

In the example illustrated the protocol used is the RSTP protocol, to which the bridge parameterizing method according to the invention has been added.

At the following step S96, the distant topology information corresponding to the element (an item of equipment or a bridge) to be put in communication with the bridge in question is read in the table 85. This is one of the lines, the value of the field 86 of which is greater than or equal to 1, the line where the value of this field is equal to 0 being dedicated to the local network.

This step makes provision for performing a test in order to determine the type of distant topology and therefore the associated topology information.

If this step determines that the distant topology is of the "equipment" type, this means that the distant tunnel end-point has no bridge and that only one connection per tunnel is possible with this equipment, the creation of a loop then being impossible.

In the case of the RSTP protocol used here, step S97 is then executed. During this step, it is specified, using the administration interface of the bridge, that the type of port corresponds to a connection with an item of equipment (solely the case of the RSTP protocol).

If the type of distant topology is of the "simple" type, this means that the distant tunnel end-point has a bridge, but that this bridge is the only one and that no other tunnel through simple or complex networks has yet been opened, then step S98 is performed and effects an updating of the local topology information by making the local topology type change to the complex value.

This is because, in the case of a topology of the distant network of the simple type, there is no immediate risk of the creation of a loop, but any other creation of a port for the bridge in question could be a source of a loop, and consequently the type of local topology must become complex whatever its current value.

Next step S99 is executed and associates the value "link" with the type port, which indicates that the port connects two network segments (solely in the case of the RSTP protocol).

At the end of step S97 or S99, step S100 is executed and positions the FD parameter value to 0 (immediate opening of the port). This is because the topology of the distant network (of the simple or equipment type) does not risk causing the creation of a loop so that no waiting is necessary for detecting the presence thereof. It is therefore possible to open this new port without any latency time.

On the other hand, if step S96 has resulted in determining that the type of topology of the distant network is "complex", this means that it is necessary to determine in detail the topology of a local network in order to determine whether the opening of a tunnel to a complex network may generate a loop.

Step S101 is then executed and performs a test in order to determine the local topology type. To do this, provision is made for reading the local topology information, this information being present at the first line of the table 85 (value of the field 86 equal to 0), which is dedicated to the local network. The local topology information may thus be directly read on this table (field 90 of this first line).

If the result of step 101 has determined that the local topology is of the "equipment" type, this means that this equipment has no bridge to be parameterized locally (the equipment comprising simply a tunnel end-point) and the algorithm ends.

If the result of step S101 has determined that the local topology is of the "simple" type, the opening of a tunnel to a topology of the complex type requires a change of local topology. This then becomes complex since the local bridge will be connected to another bridge following the setting up of the tunnel currently being opened. The following step S102 thus performs an updating of the local topology information and then positions the new local topology value to "complex", and then passes to step S103.

Returning to step S101, if the result of the test determined that the local topology was of the complex type then step S103 is directly performed.

This step S103 determines the value of the parameter FD (corresponding to the waiting period) to be applied to the port to be created, and this value can then be calculated by means of the following formula:

$$FD = \frac{(4 \times HELLO + 3 \times DIA)}{2}$$

where DIA is the diameter of the network once the tunnel currently being opened has been opened and HELLO the interval of time between two BPDU frame sendings (typically equal to 1 second).

This formula applies for all the types of protocol determining the spanning tree and is the one used in IEEE 802.1D for obtaining the default value of 15 seconds (that is to say a hypothesis adopted where DIA is equal to 8 and HELLO is equal to 1).

In the method according to the invention, this value is not a constant but is recalculated at each new port creation by means of the information contained in the table 85.

Thus, for example in the case of a simple domestic environment where the diameter is generally 0 (or the equipment is on the same segment) and taking for the calculation of DIA the formula $DIA = dia_{max1} + dia_{max2}$, where $dia_{max1}$ and $dia_{max2}$ are the largest values in the table 85, DIA=0+1=1 is obtained. This is because $dia_{max1}$ is equal to 0 while $dia_{max2}=1$, the value 1 being added in order to take account of the opening of the tunnel. The waiting period FD is thus 4 seconds (7/2=3.5 rounded to 4).

Thus, for a tunnel connect two simple domestic networks where all the equipment is connected to a single switch, the waiting period thus determined is more than two thirds less that the waiting period (15 s) conventionally used, which makes it possible not to block the transfer of data for an excessive time, which could be assimilated by the user to a blocking of the system.

Another method of calculating FD in the cast of the RSTP protocol is based on the values of $RTT_{max}$:

$$FD = RTT_{max1} + RTT_{max2}$$

where $RTT_{max1}$ and $RTT_{max2}$ are the two largest values of $RTT_{max}$ in the table 85 (field 88).

This value of FD is in general very much less than a time of one second (a few hundreds of ms).

Once the value of FD is determined at step S103, step S104 activates the use of the spanning tree determination protocol (RSTP in the example illustrated) of the bridge via its administration interface.

A description will now be given, with the help of FIG. 7, of steps S75 and S76 consisting of parameterizing the bridge following the determination of the parameter FD described previously and creating the corresponding port.

Firstly, step S110 tests whether a spanning tree determination protocol is active on a bridge. This is because, when such a protocol is active and if the bridge is not root, the bridge parameter values (such as the value of FD) can be communicated to it only by means of the sending of a frame of the BPDU type from the root bridge.

On the other hand, if the protocol is not active, a direct configuration of the bridge is possible and is implemented at step S111 independently of whether this bridge is root or not.

If test step S110 determines that the RSTP protocol is active, then step S112 activates a temporary filtering of all the inter-bridge management messages (the packets of the BPDU type). This filtering temporarily prevents the reception of these messages by the port or ports of the bridge (whether they are received on a physical or virtual interface of the bridge) and the sending of such messages by the bridge.

This filtering thus activated makes it possible to modify the parameters of the bridge in question in order to record the value of the parameter FD of this bridge necessary for adding and activating the new port in question.

In addition, this filtering prevents the propagation to the other bridges of the value of the temporary parameter FD specific to the creation of a given port for this bridge.

For this purpose, all the tunnels already opened for the bridge in question will temporarily determine, by analysis of their Ethernet header, the frames of the BPDU type received or sent. These determined frames are then deleted and will therefore not be transferred from the socket layer 56 to the virtual interface layer 52 and vice versa.

Following the setting up of this mechanism for filtering the BPDU packets, the bridge is thus once again very temporarily isolated from the network (local or distant) and all modifications of the values of the waiting period and the other parameters will therefore not be transferred to the other bridges in the network.

Supplementary filtering is also set up by adding rules to the treatment of the incoming IP frames by the operating system. This prevents any frames of the BPDU type sent by any other bridge on the network from unwantedly modifying the values of parameters of the bridge before the new virtual bridge that is to serve as a support for the tunnel being opened is created.

In a system of the UNIX type, such a filtering is implemented by the use of parameterizing commands IPCHAINS.

Once this filter is implemented, the following test step S113 checks whether the bridge is a root bridge by interrogating its administration interface.

If it is determined that the bridge is root, a direct parameterizing of this bridge is then possible even if the RSTP protocol is active and step S114 is executed. This step uses the administration interface of the bridge in order to make the waiting value of the bridge take the value FD determined at step S103.

Returning to step S113, if the bridge is not root, only the reception of frames of the BPDU issuing from the root bridge (or simulated as such) are in a position to modify the bridge parameters.

The filtering being active the BPDU frame cannot actually come from the root bridge. It is on the other hand possible to simulate, from the tunnel application, a frame for ensuring that everything occurs as if it came from the root bridge.

For this purpose step S115 determines the root path (that is to say the tunnel that leads to the root bridge) of the bridge in question.

This operation can be performed by interrogating the bridge via its interface or consulting the table 85. Once the port number of the bridge that makes it possible to go back to the root bridge is identified, the associated tunnel is sought in this table and it will be the corresponding tunnel application 55 that will be responsible for generating, at the following step S116 (on the virtual interface 52, corresponding to the port that will identify it), a bridge configuration frame of the BPDU type.

This inter-bridge management message thus simulates an inter-bridge management message coming from the associated root bridge.

It should be noted that there does exist any filtering between the application 55 and the interface 52 so that the inter-bridge management message, which is received on the interface 52, is not filtered and therefore does indeed make it possible to configure the bridge.

This BPDU frame contains the new value of the parameters that will be allocated to the bridge as well as the MAC address of the root bridge and its identifier. This will enable the frame to be identified by the bridge to be configured as having coming from the root bridge.

Steps S114, S115 and S116 thus make it possible to configure the bridge with the parameter FD determined previously.

Whether the bridge is root or not, once steps S114 and S116 have been performed, step S117 creates a new port on the bridge (addition of a virtual interface for the tunnel currently being opened) with for this port the value of the parameter FD that was transmitted by the BPDU frame to the bridge.

In practice the tunnel end-point associated with the bridge sends a request to the bridge so that the port is created and waits until the bridge informs it in return that this operation is correctly completed.

When the port is created, step S118 gives information about the value of the field 86 of the new line created for this port with the new port number.

It should be noted that the duration of the phase during which the bridge is not longer connected to the other ports is very short (of the order of a few milliseconds) since this time corresponds to the processing time of the bridge for adding a new port (rather than its activation).

It is at the creation of the port that the value of the parameter FD is taken into account for this port, and it is the value of this parameter at the time of this creation that will define the time of the listening phase on this port (at the activation step 120).

Consequently, from this moment, it is no longer necessary to keep this value and it is then possible to remodify the value of FD (in order not to interfere with the functioning of the bridge after the creation of this port) in order to return to the old value without this affecting the activation time of the port that has just been created.

Step S119 is then executed in order to deactivate the filtering implemented at step S112 as soon as the creation of the new port is effective.

The bridge has therefore regained the same state as that in which it was before the addition of this new port. The mechanisms for determining the spanning tree can therefore resume normally and the phase of listening to the data received for the new port created (while awaiting the reception of BPDU frames) during a waiting period equal to the predetermined parameter FD (in order to detect the presence of any loop) can take place. It is the activation phase S120 of the port.

Once this new port is created and activated, the tunnel is open and the bridge is thus put in communication with the element to be connected to this bridge. Step S77 of the effective transfer of the data (FIG. 4) can therefore be implemented.

During this step the data pass through the tunnel. Once this exchange is completed, and if it is no longer necessary to keep the tunnel for other data transfers, it is then possible to close the port(s) that was opened to set up this connection.

When these ports are closed, the distant and local topology information is updated accordingly in the table 85 in order to take into account the new topology of the networks once the tunnel is closed.

Figure 9:
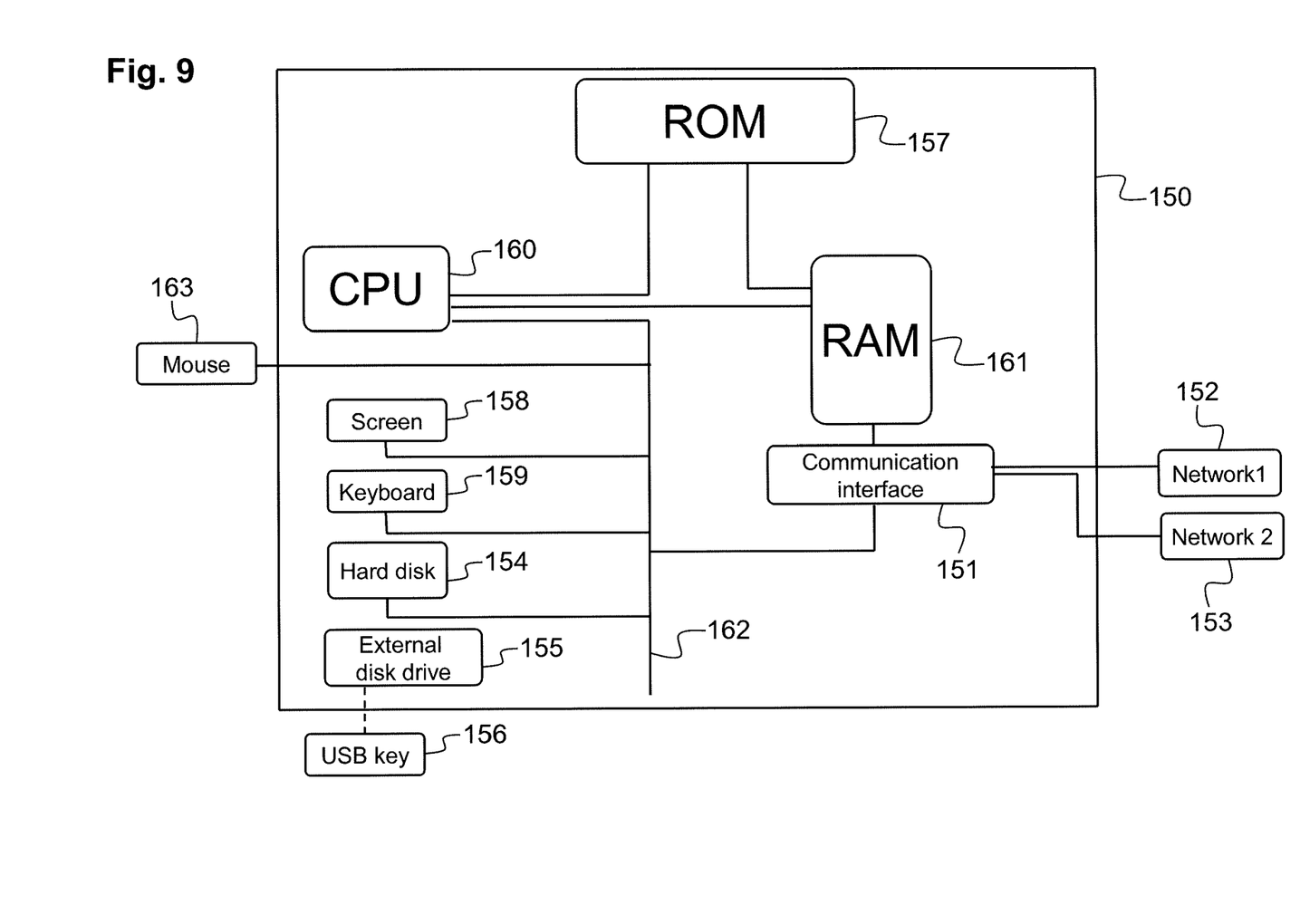
FIG. 9 shows schematically a particular embodiment of a device able to implement the present invention.

FIG. 9 illustrates a particular embodiment of a communication device 150 able to function in accordance with the present invention.

The tunnel end-points described previously are identical to the device 150.

The device 150 illustrated in FIG. 9 may comprise all or some of the means of implementing a parameterizing method according to the present invention, and which correspond in particular to means for implementing each step of the method, namely:

means for determining, according to at least one item of topology information on said network, a parameter representing a predetermined waiting period and corresponding to a time for detecting, by said bridge, during a phase of monitoring the data received by said at least one created port, a potential communication loop within said network;

means for activating a filtering of said at least one created port, said filtering being adapted to prevent the sending and reception, or by the said port or ports of the bridge already created, of inter-bridge management messages;

means for configuring the bridge with said parameter thus determined;

means for creating a new port of said bridge with a view to setting up communication with said at least one element; and means for deactivating said filtering.

This device 150 comprises a communication interface 151 connected to the networks 152 and 153. The device 150 also comprises a permanent storage means 154, such as a hard disk, as well as a reader for temporary information storage means such as a reader 155 for an external disk 156 such as a USB key.

The key 156 and the hard disk 154 may contain software implantation data of the invention as well as the code of the computer program or programs whose execution by the device 150 implements the present invention, this code being for example stored on the hard disk 154 once it has been read by the device 150.

In a variant, the program or programs enabling the device 150 to implement the invention are stored in a read only memory (for example of the ROM type) 157.

According to another variant, this program or programs are received completely or partially through the communication networks in order to be stored as indicated.

The device 150 also comprises a screen 158 for displaying the information or serving as a graphical interface with the user, so that the user can interact with the programs according to the invention by means of the keyboard 159 or any other appropriate pointing and/or entry means such as a mouse, an optical pen, etc.

A calculation unit or central processing unit (CPU) 160 executes the instructions relating to the implementation of the invention, these instructions being stored in the read only memory ROM 157 or in the other storage elements described.

When the device 150 is powered up, the processing programs and methods stored in one of the non-volatile memories, for example the ROM 157, are transferred into a random access memory (for example of the RAM type) 161, which then contains the executable code of the invention as well as the variables necessary for implementing the invention.

In a variant, the algorithm of the parameterizing method can be stored in various storage locations. In general terms, an information storage means that can be read by a computer or by a microprocessor, integrated or not in the device, possibly removable, can store one or more programs whose execution implements the parameterizing method described previously.

It is possible to change the particular embodiment chosen for the invention, for example by adding updated or enhanced parameterizing methods; in such a case, these new methods can be transmitted to the device 150 by one of the communication networks 152 or 153, or loaded into the device 150 by means of a key 156. Naturally the key 156 can be replaced by any information carrier deemed appropriated (CD-ROM, diskette, etc).

A communication bus 162 affords communication between the various elements of the device 150 and the elements connected thereto. It should be noted that the representation of the bus 162 is not limitative. This is because the central unit CPU 160 is for example able to communicate instructions to any element of the device 150, directly or by means of another element of this device.

It should be noted that, for calculating the waiting period FD, calculation formulae other than those described above can of course be envisaged.

According to a variant, protocols other than the RSTP protocol can be improved with the method according to the invention. It may for example be a case of the STP protocol (with omission of steps S97 and S99 in FIG. 6).

Many other variants are possible according to circumstances, and it should be stated in this regard that the invention is not limited to the examples described and depicted.

The invention claimed is:

1. A method of parameterizing, within a network, a bridge to be put in communication with at least one element to be connected to the bridge, the bridge comprising at least one created port, wherein the method comprises the following steps:

determining, when creating a new port of the bridge, according to at least one item of the actual topology information on the network at a time of its opening, a parameter representing a predetermined waiting period and corresponding to a period for detecting by the bridge a potential communication loop within the network, during a phase of monitoring the data received by the at least one created port;

activating a filtering during the waiting period of the at least one created port, the filtering being adapted to prevent sending and receiving inter-bridge management messages via the at least one created port in order to isolate the at least one created port from the network;

configuring the bridge with the determined parameter;

creating a new port of the bridge to set up the communication with the at least one element; and deactivating the filtering once the configuring and creating steps are completed, wherein the configuring and creating steps are performed while the filtering is activated without sending and receiving inter-bridge management messages, wherein putting the bridge in communication with the element to be connected to the bridge is implemented by setting up a tunnel between the new port and the element, and wherein the bridge is associated with a tunnel end-point adapted to set up the tunnel.

2. The method according to claim 1, wherein the step of determining a parameter representing a predetermined waiting period is obtained according to at least one item of topology information on the network relating to the element.

3. The method according to claim 2, wherein the step of determining a parameter representing a predetermined waiting period is further obtained according to at least one item of topology information on the network relating to the bridge.

4. The method according to claim 2, further comprising a step of updating each item of topology information.

5. The method according to claim 1, wherein, in the case that the bridge is root, the step of configuring the bridge is implemented by a direct configuration of the bridge.

6. The method according to claim 1, wherein, in the case where the bridge is not root, the step of configuring the bridge comprises a step of determining, within the network, a path to the root bridge associated with this bridge and a step of generating an inter-bridge management message simulating an inter-bridge management message coming from the associated root bridge via the determined path.

7. The method according to claim 6, wherein the step of configuring the bridge further comprises a step of receiving the inter-bridge management message via a virtual interface of the bridge.

8. The method according to claim 1, wherein the step of determining the parameter representing the predetermined waiting period is also implemented using at least one other item of information obtained from requests exchanged between the bridge and the element to be connected to the bridge before setting up the communication.

9. A device for parameterizing, within a network, a bridge to be put in communication with at least one element to be connected to the bridge, the bridge comprising at least one created port, wherein the device comprises:
    means for determining, when creating a new port of the bridge, according to at least one item of the actual topology information on the network at a time of its opening, a parameter representing a predetermined waiting period and corresponding to a period for detecting by the bridge a potential communication loop within the network, during a phase of monitoring the data received by the at least one created port;
    means for activating a filtering during the waiting period of the at least one created port, the filtering being adapted to prevent sending and receiving inter-bridge management messages via the at least one created port in order to isolate the at least one created port from the network;
    configuring means for configuring the bridge with the determined parameter;
    means for creating a new port of the bridge to set up the communication with the at least one element; and
    means for deactivating the filtering once the configuring and creating are completed,
    wherein the configuring means configures the bridge while the filtering is activated and the creating means creates the new port of the bridge while the filtering is activated without sending and receiving inter-bridge management messages,
    wherein putting the bridge in communication with the element to be connected to the bridge is implemented by setting up a tunnel between the new port and the element, and
    wherein the bridge is associated with a tunnel end-point adapted to set up the tunnel.

10. A non-transitory computer-readable medium storing instructions of a computer program, wherein the program enables a method comprising the following steps:
    determining, when creating a new port of the bridge, according to at least one item of the actual topology information on a network at a time of its opening, a parameter representing a predetermined waiting period and corresponding to a period for detecting by a bridge a potential communication loop within the network, during a phase of monitoring the data received by at least one created port;
    activating a filtering during the waiting period of the at least one created port, the filtering being adapted to prevent sending and receiving inter-bridge management messages via the at least one created port in order to isolate the at least one created port from the network;
    configuring the bridge with the determined parameter;
    creating a new port of the bridge to set up the communication with the at least one element; and
    deactivating the filtering once the configuring and creating steps are completed,
    wherein the configuring and creating steps are performed while the filtering is activated without sending and receiving inter-bridge management messages,
    wherein putting the bridge in communication with the element to be connected to the bridge is implemented by setting up a tunnel between the new port and the element, and
    wherein the bridge is associated with a tunnel end-point adapted to set up the tunnel.

* * * * *